Oct. 10, 1961  C. N. WILLIAMSON  3,004,220
FREQUENCY RESPONSIVE NETWORK
Filed Aug. 20, 1957  3 Sheets-Sheet 1

INVENTOR.
CLIFFORD N. WILLIAMSON

Oct. 10, 1961  C. N. WILLIAMSON  3,004,220
FREQUENCY RESPONSIVE NETWORK
Filed Aug. 20, 1957  3 Sheets-Sheet 3

INVENTOR.
CLIFFORD N. WILLIAMSON

United States Patent Office 3,004,220
Patented Oct. 10, 1961

3,004,220
FREQUENCY RESPONSIVE NETWORK
Clifford N. Williamson, Broward County, Fla., assignor to Airpax Electronics Incorporated, a corporation of Maryland
Filed Aug. 20, 1957, Ser. No. 712,601
3 Claims. (Cl. 324—78)
(Filed under Rule 47(b) and 35 U.S.C. 118)

This invention relates to electric networks and more particularly to networks of this character for translating variations in the frequency of input energy into variations in the amplitude of output energy.

The problem of frequency indication and control, and its closely related corollary, speed indication and control, has received much attention and effort in the past. The indication and control outputs best lending themselves to utilization represent changes in frequency and in speed by change in the magnitude of the output stimulus. Hence the sensing of frequency has usually involved conversion between frequency as one variable and amplitude as the dependent variable. True frequency and speed sensing requires immunity to the customarily encountered disturbing ambient influences, such as input amplitude, wave form, temperature, vibration, mechanical wear, and detoriation owing to the life characteristic of the elements used in performing the transducing function. In addition, flexibility of application severely limits the acceptability of any technique using large numbers of components, bulky parts, or auxiliary energy sources.

Generally, and especially when used to monitor or adjust some operating condition, only a limited portion of the frequency spectrum under observation is of importance, so that it is desired to expand the scale or conversion factor representing the variation of the output stimulus in the region of interest, while the conversion factor is of much less importance in other portions of the frequency spectrum. Where such expanded regions are used for the conversion factor, strict adherence to some reference nature, such as linearity, may be required, and it is further necessary that these features be readily adjusted to insure uniformity between successive units in large scale production, using parts with commercial tolerances.

Accordingly, it is a principal object of the invention to provide new and novel frequency-to-amplitude transducing apparatus.

Another object of the invention is to provide frequency-to-amplitude transducing apparatus with improved reliability of output indication.

Still another object of the invention is to provide new and improved frequency-to-amplitude transducing apparatus in which the output stimulus changes at a rate greater than the rate of change of input frequency.

Yet another object of the invention is to provide a frequency-to-amplitude transducer with a virtual suppressed zero and a relative change of output amplitude large compared to a corresponding relative change of input frequency conversion factor over a predetermined range.

A further object of the invention is to provide a frequency indicator having an expanded scale factor over the range of the associated indicating instrument and which is completely signal powered.

The above object and advantages of the invention are accomplished in an arrangement which delivers energy to a work circuit, such as an indicating instrument or the input to control apparatus, with two opposing senses, the flow of energy in one sense being controlled from the signal circuit to provide a first transfer factor, which may be linear, and the flow of energy in the other sense being controlled from the signal circuit to provide a second transfer factor resulting in a different slope that, over the indicating range, projected if necessary, intersects the output ordinate at a point other than the origin. That is, both the slope and the intercept of the second transfer factor differ from the respective properties of the first transfer factor.

Other objects and advantages of the invention will in part be described and in part be obvious when the following description is read in conjunction with the drawings in which.

Figure 1:
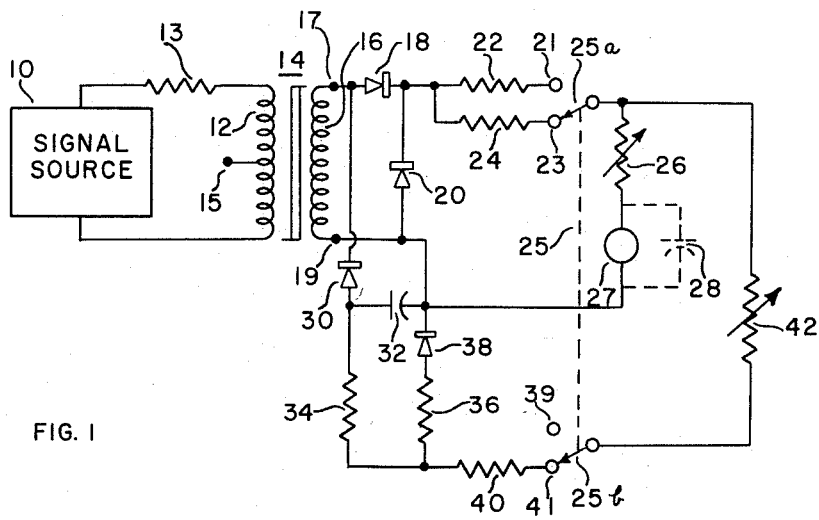
FIGURE 1 is a schematic illustration of a representative embodiment showing the invention in one form, utilizing a saturating transformer with single primary and single secondary winding.

Referring now to FIGURE 1, the source of the electric waves whose frequency is to be monitored or measured is indicated generally at 10. The source 10 may be connected with the primary winding 12 of the transformer 14 through a resistance 13. As will be discussed more fully, later, the transformer 14 is provided with a core magnetic structure having what is known as a flat topped relationship between the impressed magnetomotive force (H) and the magnetic flux density (B) traversing the magnetic circuit, this relationship being frequently designated the B—H characteristic. The slope of this B—H characteristic generally decreases at extremes of impressed magentomotive force. As a consequence, at these extremes, even substantial changes in magnetizing force produce small changes in flux density. If the changes in flux density are neligible, the core material is said to possess a topped hysteresis loop or B—H characteristic. Materials for which the proportional change in $B_s$ with change in available maximum magnetomotive force is considerably less than the change in available maximum magnetomotive force (for example five percent increase in $B_s$ with thirty percent increase in maximum magnetomotive force) may be referred to as having a flat topped saturation characteristic. Generally, a ratio of five to one or more between change in maximum magnetomotive force and change in $B_s$ will qualify a material for this designation. The core material of transformer 14 is chosen so that the core fully saturates in the presence of electric energy from source 10 flowing in primary winding 12. The flatter the B—H characteristic in the region of saturation, the easier it is to compensate the network for effects of changes in input voltage, as decribed below. In a transformer with a core of such characteristics, the current flow through the primary winding is small, due to the high inductance presented by the primary winding, until the core saturates, after which the primary current rises rapidly to a very high value, limited essentially by the internal impedance of the source and the primary winding resistance. Therefore, if the source 10 is not possessed, intrinsically, of a very high internal impedance, the addition of the resistance 13 becomes desirable to limit the current flowing through the primary winding 12 after saturation of the transformer core.

The primary winding 12 is shown as provided with a center tap 15, permitting excitation of the transformer 14 either from an unbalanced source, as shown, or from a source balanced about a return point connected with the tap 15.

The transformer 14, is also provided with a secondary winding 16, having terminals 17, 19. A rectifier 18 has its anode connected with the terminal 17 of the secondary 16 and its cathode connected with one end of the resistances 22 and 24. The other end of resistance 22 is connected with the stationary contact 21 of the switch section 25a, while the other end of resistance 24 is connected with the stationary contact 23 of switch section 25a. A diode 20 is also connected with the cathode of diode 18, the cathode of diode 20 being connected with the cathode of diode 18, and the anode of diode 20 being connected with the terminal 19 of the secondary winding 16. The circuit receiving output current from the rectifier 18 is completed by the connection of the adjustable resistance 26 in series with the load device 27 to the terminal 19 of the secondary winding 16. The load device 27 may be any desired work circuit, or an indicating instrument. If a moving coil indicating instrument, the required averaging of the waves received from the output of rectifier 18 is performed by the mechanical constants of the moving system. If the load device 27 is an inertialess electric element, such as the input to further control circuitry, it may be desirable to add in shunt therewith a capacitor 28, whose connections are shown in dashed lines as an indication of its optional nature.

Current through the load device may be further provided by an additional circuit energized from the secondary 16 of the transformer 14. In this circuit, a diode 30 has its cathode connected with the terminal 17 of the winding 16, and its anode connected with one terminal of the capacitor 32 whose other terminal is connected with the secondary terminal 19. A network for supplying regulated voltage is connected in shunt with said capacitor, this network consisting of a resistance 34 connected in series with a resistance 36 to the anode of a regulating device 38, which may be a semiconductor diode achieving its regulating action by way of the Zener effect, in which such a diode subjected to a potential poled for minimum current flow exhibits a very steeply rising potential as the reverse current rises, until the potential reaches a critical region, after which further increases in current flow produce only small additional changes in voltage. Thus, the slope of the current-voltage relationship, or characteristic, in the regulating region is much less than the slope of a line connecting the plot origin with the operating point. While a Zener diode has been specifically mentioned, other regulating devices may be used in its place, subject to the limitations growing out of their intrinsic characteristics.

The junction point of resistances 34 and 36 is connected by way of resistance 40 with the fixed contact 41 of switch section 25b, the other fixed contact 39 thereof, being free. The movable contact of switch section 25b is connected through variable resistance 42 with the movable contact of switch section 25a. Switch sections 25a and 25b are connected for ganged simultaneous operation over the common mechanical linkage 25.

As is now well known, each polarity reversed wave delivered by the source 10 produces across the secondary winding 16 an output wave with a substantially constant volt-second product. If the B—H characteristic of the core in transformer 14 were perfectly flat topped, the volt-second product of each output pulse would be quite constant, and related to the core magnetic circuit characteristics by the relationship:

$$\int_{t_1}^{t_2} E\,dt = -2N_p B_s A \frac{N_s}{N_p} \times 10^{-8} \text{ volt-seconds}$$

Where $t_2 - t_1$ is the time interval of integration.
E is the instantaneous value of the applied voltage.
$t$ is time in seconds.
$N_p$ is the number of turns in the primary winding 12.
$N_s$ is the number of turns in the secondary winding 16.
$B_s$ is the saturation flux density in gauss.
A is the core area in sq. cms.

When, as in the practical case, the B—H characteristic is not perfectly flat topped, the output wave is not perfectly volt-second limited, but has a volt-second product rising somewhat with increasing applied potential (or with a peaking of the wave form) raising a problem whose solution is presented later.

The network of FIGURE 1 may be conveniently regarded as consisting of two loops, one fed from the diode 18 which supplies volt-second limited waves to the load device 27, one volt-second limited pulse for every other polarity reversal of the input wave, and the other fed from the diode 30, and including the voltage regulating device 38, which supplies a current through the adjustable resistance 42 to the load device 27 in opposition to the current flowing therethrough from the diode 18.

Only the first of these loops is closed when the switch arms 25a and 25b are in their upper positions, so that a current proportional to the number of volt-second limited waves per unit time flows through the load device. Since the number of such waves, with the half wave rectifiers shown, is equal to the frequency of the input wave, the current flow through the load device 27 is linearly proportional to the frequency of said input wave and is zero with zero input frequency.

When the switch arms 25a and 25b are in their lower position, both circuit loops are closed, so that two opposing current components pass through the load device, the one from the diode 18 increasing with increasing frequency, while the current derived from the diode 30 by way of the regulating device 38 is essentially independent of frequency under normal operating conditions. Thus the current through the load device is zero at some frequency, determined by the network parameters, and increases substantially linearly as the input frequency is increased beyond the value producing current balance.

In discussing the operating characteristics of the circuit schematically portrayed in FIGURE 1, it will be helpful to refer to a typical set of parameters, such as will produce, for example with switches 25a, 25b in their upper position full scale deflection of a 50 microampere D.C. instrument at 500 c.p.s. with a 115 R.M.S. volt, substantially sinusoidal wave applied in the position of the source 10. With the switches 25a, 25b in their lower position, the current through this load device varies from zero at 375 c.p.s. input frequency to 50 microamperes at 425 c.p.s. input frequency. Such parameters are:

Transformer 14.
Primary winding 12: 1000 turns No. 40 enameled magnet wire each side of center tap.
Secondary winding 18: 445 turns of enameled magnet wire.
Core: Tape wound 50% nickel iron grain oriented alloy, such as core commercially designated 51000–2A by Magnetics, Inc.
Diodes 18, 20, 30: Semiconductor type commercially designated type 1N91.
Regulating device 29: Semiconductor Zener diode commercially designated Transitron type SV–9.
Capacitor 32: 0.5 microfarad.
Capacitor 28: Optional in size, depending upon averaging period desired. Typical value with 1500 ohm load is in region of 100 microfarads.
Load Device 27: D.C. microammeter, 50 microamperes full scale.
Resistance 13: 12,000 ohms.

Resistance 22: 110,000 ohms.
Resistance 24: 6,800 ohms.
Resistance 26: Adjusted as noted. Together with load device 27 totals approximately 2,800 ohms.
Resistance 34: 5,000 ohms.
Resistance 36: 51 ohms in typical network.
Resistance 40: 10,000 ohms in series with 2,000 ohms resistor having a positive temperature coefficient of 0.5%/° C.
Resistance 42: Adjusted to produce zero current through load device 27. Typically 500 ohms.

Operation of the network for the two different settings of the switches 25a and 25b will now be described. Each time the input wave supplied by the source 10 reverses in polarity and remains in a condition of such reversed polarity for a time sufficient to drive the magnetic core circuit from one condition of saturation to the other, a volt-second limited pulse is delivered to the terminals 17, 19 of the secondary winding 16. The design of the transformer 14 is always so related to the characteristics of the source 10 that this condition is satisfied. Alternately, if this is not conveninetly possible, a pulse shaper or pulse stretcher may be interposed between the source 10 and the primary winding 12.

During the portion of the operating cycle when the terminal 17 of the secondary 16 is positive with respect to the terminal 19, the diode 18 passes current through its low forward resistance to the load device 27 through a circuit including the switch section 25a. Assuming that the switch section 25a is in the upper position, the volt-second limited waves are impressed on the circuit including resistance 22, fixed contact 21, the movable contact of switch section 25a, resistance 26 and load device 27. The circuit through resistance 42 is opened at switch section 25b, so that this portion of the circuit has no influence with the switches in the position assumed, and the positive pulses from the output of the diode 18 appear across the dode 20 with a polarity which sees the high back resistance of diode 20, this diode therefore presenting essentially an open circuit at this time. Since the circuit loop described is practically purely resistive, current waves corresponding to the volt-second limited voltage waves at the output of the diode 18 flow through the load device 27. When the load device 27 is an indicating instrument, smoothing averaging is performed by the mechanical constants of the moving system. In those situations where it might be desired to measure frequencies which are so low that the averaging period of the moving system is not adequate to provide a steady indication, the averaging may be assisted by adding the shunt capacitor 28. If such addition be made to an already adjusted and calibrated network, re-calibration in the manner to be described below will be generally desirable.

The load device is now traversed by current pulses having a standardized microampere-second content for every other polarity reversal at the input to the transformer 14. Since the number of such microampere-second standardized pulses is proportional to the input frequency, the averaged value of the current, corresponding to the deflection of the instrument, is proportional to the input frequency, being zero for zero input frequency.

During the next portion of the operating cycle, the terminal 17 of the secondary winding 16 swings negative with respect to terminal 19, placing reverse potential across diode 18, which then presents a very high back resistance to the flow of current. If any back current does flow, it is shunted from the measuring network by diode 20, which presents only a low resistance to the flow of such reverse current through the diode 18.

Under the foregoing conditions of operation, the indicating device in the position of load device 27 experiences zero deflection with either zero input frequency or with no input potential, and is deflected full scale with an input wave having a frequency of 500 c.p.s., changing linearly between these extremes in relation to changing input frequency. Calibration is simply effected, the resistance 22 being adjusted to produce full scale deflection with energy from a 500 c.p.s. source applied to the input circuit for transformer 14, after resistance 26 has been adjusted as later described in connection with expanded scale operation.

Expanded scale operation is obtained by placing the switches 25a and 25b in their lower position. With expanded scale operation, the indicating instrument displays zero deflection with either no input supplied by the source 10, or with a wave of predetermined frequency applied, 375 c.p.s. in the illustrative network, in a manner to be discussed. Full scale deflection is produced by a somewhat higher frequency, 425 c.p.s. in the example shown.

When the switches 25a, 25b are in their lower position, the mode of operation of the upper network loop is unchanged, except that the current flow takes place through the resistance 24, whereby a larger current flows in the form of microampere-second limited pulses, the average current therefore changing more rapidly with frequency. At 400 c.p.s., therefore, the current flowing through the indicating instrument 27 from the upper circuit loop is much more than 50 microamperes. However, an opposing current is impressed on the load device 27 from the lower circuit loop through the resistance 42 acting in conjunction with the voltage regulating device 38. This circuit receives its energization from the secondary 16 of transformer 14 by way of the diode 30. When the terminal 17 of winding 16 becomes negative with respect to the terminal 19, current flows in the forward direction through diode 30 to charge the left hand terminal of capacitor 32 negatively. This process occurs repetitively maintaining the capacitor 32 charged. The following positive excursions of terminal 17 are without effect, because presented to the back resistance of the diode 30.

The charged condition of capacitor 32 produces a current flow through the circuit formed by resistance 34, resistance 36 and Zener diode 38, producing a substantially constant voltage across Zener diode 38 when the input potential from the source 10 is in its operating region. Resistance 36 is small in comparison with resistance 34, so that only a small voltage drop occurs thereacross, which is added to the potential appearing across the Zener diode 38 and the sum impressed on the zero suppressing circuit loop made up by the resistance 40, resistance 42, resistance 26, and load device 27. It will be noted that the current flowing in the lower loop is poled oppositely in the load device 27 with respect to that flowing in the upper circuit loop.

The magnitude of capacitor 32 is selected in conjunction with the resistance presented by the circuit arm connected in shunt therewith to provide a time constant maintaining the current through the Zener diode 38 high enough to insure continuing regulating action throughout the entire operating cycle.

Owing to the imperfectly flat saturation nature of the B—H characteristic of the magnetic core circuit, changes in the magnitude of voltage supplied by the source 10 change the volt-second product of the waves delivered at the secondary winding terminals 17, 19 slightly, this product increasing with increasing input voltage. This, taken alone, would tend to upset the current balance between the two circuits, thereby changing the frequency at which the currents flowing in the upper and lower circuit loops become equal. Such effects are minimized by the fact that increasing input voltage, while resulting in very nearly constant volt-second product for each pulse from the secondary does so by increasing the peak voltage appearing across the secondary, thus increasing the potential to which capacitor 32 is charged. The resulting increase in current, somewhat increases the voltage across Zener 38, to drive additional current through the zero suppressing loop including resistance 42. When the increase in voltage across Zener diode 38 is inadequate to completely compensate for this effect, the addition of resistance 36 provides a further positive increment in zero suppressing voltage with increasing input voltage.

The regulating voltage across Zener diode 38 also changes slightly with temperature, increasing with increasing temperature. Compensation for this may be effected in a number of ways, including temperature induced decrease in the voltage across resistance 36, or temperature induced increase in the loop including resistance 42. In this illustrative embodiment, the latter practice has been demonstrated, a portion of resistance 40 being made up of a resistance with positive temperature coefficient. The increasing voltage of the Zener diode with temperature can also be compensated by a resistance 24 with a negative temperature coefficient. Known methods such as using powdered iron core together with a laminated or tape wound core in transformer 14, the powdered core providing a temperature coefficient in opposition to that of the laminated or tape wound core, the total core being composed of the two parts in proportion to give the required net temperature coefficient.

The circuit is adjusted by applying, from a suitable source, connected in the manner indicated for the source 10 in FIGURE 1, an alternative electric wave with a nominal voltage of 115 v. R.M.S. having a frequency known to be 500 c.p.s. and adjusting resistance 22, if necessary, with switches 25a and 25b in their upper, to produce full scale current of 50 microamperes through the load or indicating device 27. Alternately, the known frequency can be any fraction of the desired full scale calibration in which case resistance 22 is adjusted to produce that fraction of full scale current or indication.

Adjustment with the switches 25a, 25b in the lower or expanded range position is accomplished by first impressing an electric wave with a frequency of 375 c.p.s. from the standard source and adjusting resistance 42 to produce zero current through the load device 27, corresponding to zero deflection on the indicating instrument. The frequency from the standard source is then changed to 425 c.p.s., and resistance 26 adjusted to produce a current of 50 microamperes through the load device 27, corresponding to full scale deflection for the indicating instrument. The process is repeated, if necessary until both conditions are satisfied. Although this is a preferred technique with the calibration frequencies at the extremes of the scale, any two frequencies can be used with the indicating instrument or other load 27 and the adjustments made to pass the corresponding currents through load 27. When so adjusted, the currents through the various loops and the load device 27 vary with input frequency during expanded scale operation in the manner illustrated in FIGURE 2, where currents are plotted as ordinates, and the frequency is plotted along the abscissa.

The current flowing through the upper circuit loop including resistance 24 is related to frequency as shown by the curve 50, which is essentially linear to about 2f, where f is the lower frequency limit of the expanded scale. The current flowing to the load device 27 by way of the resistance 42 is indicated generally as related to frequency according to the curve 52. The ordinates of this curve are seen to be negative, corresponding to the opposing polarities of current flow through load device 27 from the upper and lower circuit loops. The current in the lower loop, which may be called the bias current reaches a value very close to its ultimate asymptotic value of 0.7f.

Figure 2:
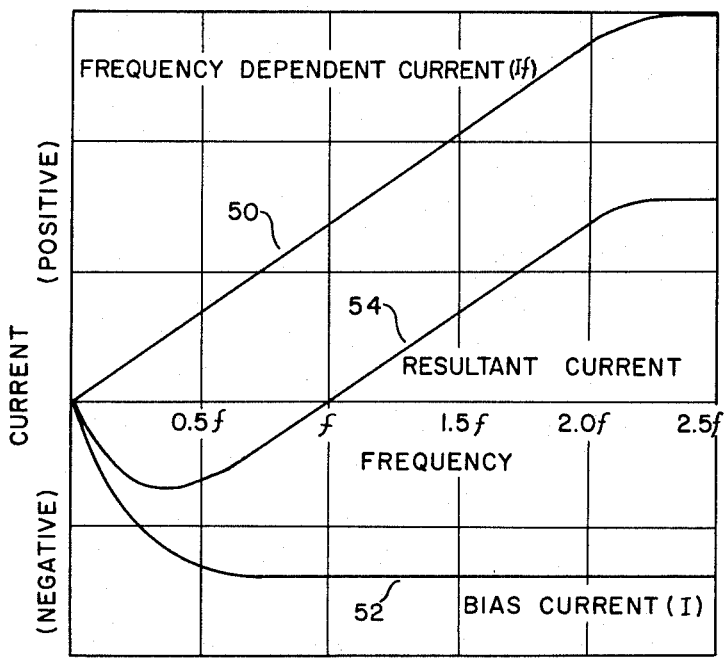
FIGURE 2 illustrates the variation in currents flowing through the work circuit of FIGURE 1 with changing input frequency.

The resultant of these two currents, which is the net current flowing through the load device 27, is shown as curve 54, which is zero, by adjustment, as previously described, at f and has a slope corresponding to the degree of scale expansion desired, this slope being fixed by the value of resistance 24, and corresponding to the slope of curve 50. It may be of interest to note that the net or resultant curve is negative below the frequency f, having its maximum negative value between 0.4f and 0.5f. In the network schematically illustrated in FIGURE 1, f is 375 c.p.s., as has been earlier stated. The graphic representations of FIGURE 2 are intended primarily to illustrate the general behavior of the network, and are subject to variation according to the components used. The influence of waveform change is mainly second order, as long as the harmonic content is low enough to avoid additional zero axis crossings of the voltage wave. Typical characteristics achieved in an expanded scale instrument with the range 375 c.p.s. to 425 c.p.s. are:

Input power—Approximately 1 watt.
Linearity—Within ¼% of 400 c.p.s.
Reproducibility—Within ¼% of 400 c.p.s.
Voltage effect—Within ¼% of 400 c.p.s. 100 volts R.M.S. to 130 volts R.M.S.
Temperature effect—Not more than ±½% of 400 c.p.s. 0° C. to 50° C.

Figure 3:
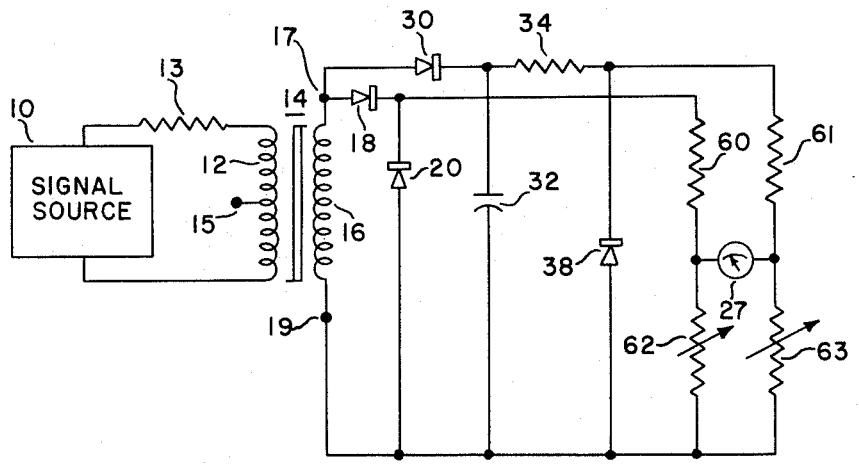
FIGURE 3 is a schematic description of a second embodiment illustrating the principles of the invention and using a saturating transformer with single primary and single secondary winding.

A different arrangement for taking advantage of the principles of the invention is shown in FIGURE 3, in which corresponding parts are identified by corresponding reference characters. The source of energy whose frequency is to be monitored is again shown at 10, connected with the primary 12 of transformer 14. As before, the presence of the center tap 15 permits use with either balanced or unbalanced circuits. The secondary 16 of the transformer has terminals 17, 19, and the diode 18 has its anode connected with secondary terminal 17. The cathode of the diode 18 is connected with the cathode of diode 20, whose anode is connected with the secondary terminal 19, and the common terminal between the two aforesaid diodes is connected with one end of resistance 60. The other end of resistance 60 is connected with the terminal 19 of secondary 16 by way of adjustable resistance 62. A current whose magnitude is controlled by the frequency of the input wave flows through this circuit.

A second circuit powered from the secondary 16 through the diode 30 whose anode is connected with the terminal 17 of secondary 16, and whose cathode is connected with one terminal of the capacitor 32. The other terminal of capacitor 32 is connected with secondary terminal 19. The resistance 34 connects the cathode of diode 30 with the cathode of Zener diode 38. The anode of diode 38 is returned to secondary terminal 19, and resistances 61 and 63 are connected in series across Zener diode 38, resistance 63 being adjustable, and connected at one end with the secondary terminal 19. These components form a circuit with current varying generally according to the curve 52 of FIGURE 2.

The load device 27, illustrated as an indicating instrument, is bridged between the common terminal of resistances 60 and 62, and the common terminal of resistances 61 and 63. When the junction points are equal in potential, no current flows through the load device 27. Current flow produced therethrough has one polarity for currents from the first loop, and reverse polarity for currents from the second circuit loop.

The network of FIGURE 3 is adapted for expanded scale operation, but may vary in component characteristics from the circuit of FIGURE 1. An important difference is the fact that transformer loading during successive cycles is not so well balanced as in the network of FIGURE 1, for, in FIGURE 3, diodes 18 and 30 both conduct during the positive half cycle, and neither conducts during the succeeding negative half cycle, giving rise to considerably different transformer loading during these two periods. In the circuit of FIGURE 1, on the other hand, diode 18 conducts during the positive half cycle, and not during the negative half cycle, while diode 30 conducts during the negative half-cycle, and not during the positive half-cycle, so that the transformer loading during each of these half-cycles is more nearly equal.

In adjusting the network of FIGURE 3, a standard frequency source having outputs of 375 c.p.s. and 425 c.p.s. may again be used. With an input frequency of 375 c.p.s., resistance 63 may be adjusted for zero current through the load device, and with the input frequency changed to 425 c.p.s., resistance 62 may be adjusted to secure the desired current flow through the load device 27. In the case of an indicating instrument this latter would correspond to full scale deflection. The process is repeated, changing the frequency back and forth, until both conditions are met. The choice of resistances to be made adjustable, and the sequence of adjustment may be varied, to suit individual designer's preferences. The component and resultant currents through the load device 27 follow the general shape of the curves of FIGURE 2, the frequency dependent current flowing through resistances 60, 62, while the bias current flows through resistances 61, 63.

Figure 4:
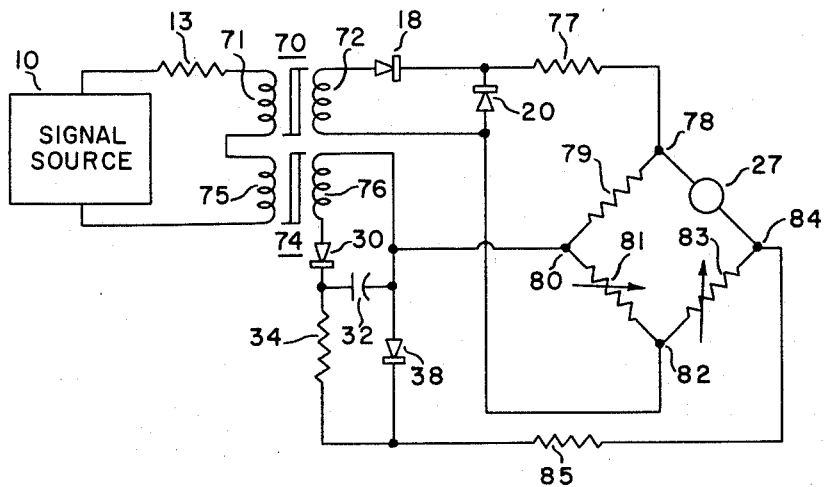
FIGURE 4 is a schematic description of still another embodiment illustrating the principles of the invention with the use of two transformers transferring energy between the signal source and two work circuit excitation networks.

Each of the foregoing arrangements has used a common transformer, with a common secondary linking the common source with the frequency responsive network. A rather different arrangement is shown in FIGURE 4, illustrating the use of two transformers, and a somewhat different network arrangement for producing opposing currents in the load device.

The source 10 is here connected through resistance 13 with the serially connected primaries 71, 75 of transformers 70, 74 respectively. Alternatively, the primaries of the transformers may each be individually connected through separate limiting resistors, such as resistance 13, with the source 10. Transformer 70 must be of the saturating core having a flat topped B—H characteristic. It is preferable that transformer 74 be of this type, also although reasonably effective operation, with some sacrifice in performance, may still be obtained when transformer 74 is not of this type. Alternatively the two transformers can be parallely connected with resistance 13 preferably in series only with transformer 70 in which case transformer 74 can be a conventional unit that operates at all times below the knee of its B—H characteristics; that is, does not saturate.

The frequency dependent current is derived from the secondary 72 of transformer 70, the diodes 18, 20 being connected in series with opposing polarities across the winding 72. The anode of diode 18 is connected with one end of secondary winding 72, and the anode of diode 20 is connected with the other end of said secondary winding. The cathode of the diode 18 is linked through resistance 77 with the point 78 which is common to one terminal of the resistance 79 and one terminal of the load device 27. The other end of the resistance 79 is connected by way of the point 80 to one end of the adjustable resistor 81, whose other end is linked to the point 82 and thence to the end of the secondary winding 72 which is tied to the cathode of diode 20. A further adjustable resistance 83 is connected between the point 82 and the remaining end of the load device 27 by way of point 84.

A current relatively independent of frequency under normal operating conditions is supplied from the circuit energized by secondary winding 76 of transformer 74. One end of winding 76 is connected with the point 80, while the other end of said winding feeds the anode of diode 30, whose cathode is linked to one terminal of the capacitor 32 having its other terminal connected with the point 80. A limiting resistance 34 connects the cathode of diode 30 with the cathode of Zener diode 38, whose anode is connected directly with point 80 and whose cathode is connected through resistor 85 with point 84. As before, adjustment of resistors 81 and 83 with different standard applied frequencies permits calibration.

Figure 5:
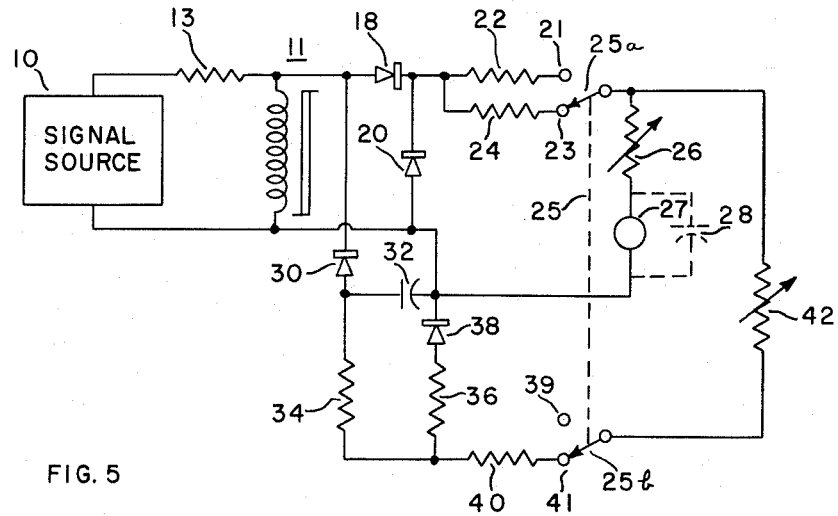
FIGURE 5 is a schematic description of a network with single saturating reactor illustrating the principle of opposed current application to a common work circuit.

In each of the foregoing arrangements, the presence of one or more transformers has provided direct current isolation between the source circuits and the output circuits. A simpler arrangement appears in FIGURE 5, illustrating the use of a single winding inductor with saturation core having a flat topped B—H characteristic. The reference characters and network in this FIGURE 5 are the same as in FIGURE 1, excepting only that the winding on reactor 11 is common to both the input and output circuits. As before, the reactor, in combination with the source 10 and limiting resistance 13, provides volt-second limited waves. The operation will be readily understood, with this in mind, by reference to the description of FIGURE 1.

Figure 6:
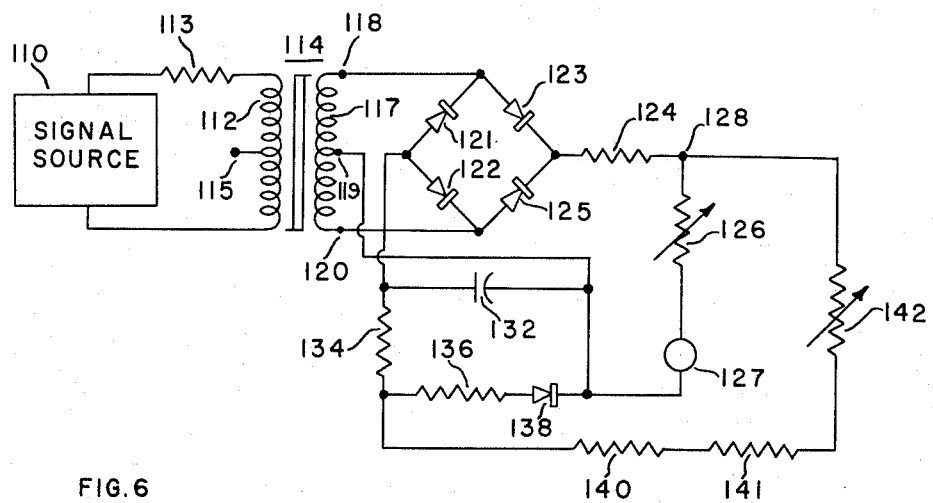
FIGURE 6 is a schematic illustration of another embodiment of the invention particularly adapted for improved operation at lower frequencies.

When an indicating instrument is used, pointer stability at low frequencies may be inadequate. In addition, when other apparatus is used for the load device 27, it may yet be desirable to have a relatively constant direct current, even at low frequencies. Full wave rectification, as shown in FIGURE 6, is helpful in both these situations, without any increase in the averaging interval, which would otherwise slow the response time, as might be objectionable in many control applications. In this embodiment, the source 110 is connected through the limiting resistor 113 with the primary 112 of the transformer 114, provided with a core having a flat topped B—H characteristic and proportioned to saturate over the desired range of operating voltages to be supplied by the source 110. Transformer primary 112 is center tapped at 115 to accommodate balanced sources.

A secondary winding 117 with end terminals 118, 120 and center tap 119 is also present on transformer 114. Diodes 121, 122 have their cathodes connected respectively to secondary terminals 118, 120 while diodes 123, 125 have their anodes connected, respectively, to the same winding terminals 118, 120. Although this arrangement of components is simple, it may be advantageous in some adaptations of the invention to add taps on secondary 117 symmetrically about center tap 119 and to connect either the anodes of diodes 123 and 125 respectively to these points of lower voltage or to connect the cathodes of diodes 121 and 122 to such taps. Similarly, the turns ratios of transformers 70 and 74 in FIGURE 4 may each be chosen as is most advantageous to the two loops. By extension, a tap can be added to the reactor 11 of FIGURE 5 for one of the loops, and to the transformers of FIGURES 1, 3 and 4. The transformer core itself can be of any convenient form such as a toroid or laminated E—I with the windings thereon. Two secondaries could be used without departing from the essential magnetic coupling.

The cathodes of diodes 123, 125 are connected together and to one end of resistance 124 feeding the junction point 128 between adjustable resistances 126 and 142. The load device 127 is connected between the other end of resistance 126 and the center tap 119 of secondary 117, to complete the circuit loop for the flow of frequency dependent current arising from the volt-second limited output waves delivered by transformer 114.

The zero suppressing current for the load device 127 is derived from the diodes 121, 122 which have their anodes connected together, and to the capacitor 132, whose other terminal is linked to the center tap 119. The diode fed terminal of capacitor 132 has a limiting resistance 134 being connected with compensating resistance 136 functioning to compensate for the slight imperfection in volt-second limiting to be expected with available materials. The Zener diode 138 completes the circuit through resistance 136 back to center tape 119. The junction between resistances 134 and 136 is connected with the point 128 through the serially arrayed temperature compensating resistance 140, fixed resistance 141 and adjustable resistance 142, completing the circuit for the flow of bias or bucking current through the load device 127.

As earlier discussed, volt-second limited waves are delivered at the output of the secondary winding 117. During each half-cycle when terminal 118 swings negatively, capacitor 132 is charged negatively through diode 121, and on the succeeding half-cycle of reverse polarity, capacitor 132 is chargeed negatively through diode 122. Between charging pulses, capacitor 132 discharges through the shunt circuit comprising resistances 134, and 136 to maintain a current through Zener diode 138 providing a nearly constant voltage thereacross. The voltage across the combination of Zener diode 138 and resistance 136 drives a current through the resistances 140, 141, 142 opposing the flow of current through resistance 124 to the load device 127. The effect of changes in Zener regulating voltage with temperature are compensated for by the use of the resistor 140 having a suitable positive temperature coefficient.

The network is calibrated in a manner similar to that for FIGURES 1 and 5, resistance 142 being adjusted for zero current in the load device with an impressed frequency corresponding to the lower end of the expanded scale, and the impressed frequency then changed to correspond to the upper frequency limit of the expanded scale, followed by the adjustment of resistance 126 for the flow of the desired current through load device 127. The above process is repeated until both conditions are satisfied with no further change in adjustments.

The simplicity of the frequency sensing network is apparent from the figures and the foregoing discussion. Of particular advantage is the fact that, when operating with the desired frequency corresponding to any current on the expanded scale, power failure results in the same indication as an off frequency condition. Also, the system is much more immune to spurious indications than many previous systems which have been considered. The output may be used equally well for control purposes as well as for direction indication. Further, as shown by curve 52 of FIGURE 2, the load current outside the region of interest remains within sufficiently narrow limits that the load is protected from over-current should the input frequency depart widely from the normal operating range.

While the principles of the invention have been described in terms of specific embodiments for ease in understanding, it will be obvious that changes may be made in configuration and components to meet the requirements of specific environments and specific applications without departing from the essence of the invention as expressed in the claims.

What is claimed is:

1. A frequency measuring circuit including an indicating device, said circuit comprising first and second networks interconnected and connected to said indicating device, means in said first network to cause a unidirectional current to flow proportional to the frequency of the impressed voltage, said first network means comprising rectifying means, said second network comprising means to rectify and regulate a current flow in said second network that is constant over the operating range of the frequency measuring circuit and independent of said frequency and of opposite polarity to the current flow in said first network, said second network means comprising rectifying means, a capacitor, and a zener diode, and means to adjust the initial and final points of the operating range of frequency to coincide with the end points of the scale of said indicating device.

2. A frequency measuring circuit including an indicating device, said circuit comprising a first and second networks interconnected and connected to said indicating device, a core material having a substantially rectangular hysteresis characteristic, first and second mutually inductive windings wound thereon, a frequency source connected to said first winding, a first network means comprising first rectifying means to cause a unidirectional current to flow proportional to the frequency, said second network comprising second rectifying means, a capacitor, and a zener diode to rectify and regulate a current flow in said second network that is constant over the operating range of the frequency measuring circuit and independent of said frequency and of opposite polarity to the current flow in said first network, and means to adjust the initial and final points of the operating range of frequency to coincide with the end points of the scale of said indicating device.

3. A frequency measuring circuit including an indicating device, said circuit comprising a first and second networks interconnected and connected to said indicating device, a core material having a substantially rectangular hysteresis characteristic, first and second mutually inductive windings wound thereon, a frequency source connected to said first winding, a first network means comprising first rectifying means to cause a unidirectional current to flow proportional to the frequency, said first recifying means connected to said secondary winding, said second network comprising second rectifying means, a capacitor, and a zener diode to rectify and regulate a current flow in said second network that is constant over the operating range of the frequency measuring circuit and independent of said frequency and of opposite polarity to the current flow in said first network, said second rectifying means interconnecting said capacitor and said secondary winding, a resistance connected in series with said zener diode and said resistance and said zener diode connected in shunt with said capacitor, and means to adjust the initial and final points of the operating range of frequency to coincide with the end points of the scale of said indicating device.

References Cited in the file of this patent

UNITED STATES PATENTS

| | | |
|---|---|---|
| 1,663,086 | Long | Mar. 20, 1928 |
| 1,902,496 | Fitzgerald | Mar. 21, 1933 |
| 2,239,906 | Tuxen | Apr. 29, 1941 |
| 2,248,586 | Rowell | July 8, 1941 |
| 2,467,035 | Huxtable et al. | Apr. 12, 1949 |
| 2,477,963 | Chapin | Aug. 2, 1949 |
| 2,751,495 | Grady | June 19, 1956 |
| 2,804,578 | Bergseth | Aug. 27, 1957 |
| 2,808,990 | Van Allen | Oct. 8, 1957 |
| 2,839,684 | Smith-Vaniz | June 17, 1958 |
| 2,849,183 | Kuck | Aug. 26, 1958 |
| 2,883,128 | Kerpchar | Apr. 21, 1959 |
| 2,908,864 | Shepard | Oct. 13, 1959 |
| 2,915,648 | Chudleigh | Dec. 1, 1959 |
| 2,947,941 | Corsen et al. | Aug. 2, 1960 |
| 2,958,038 | Kwast | Oct. 25, 1960 |